July 26, 1960 C. R. BORDERS ET AL 2,946,983

COMPARISON CIRCUITS

Filed Nov. 14, 1955

INVENTORS
CHARLES R. BORDERS
JAMES W. TONER

BY *Wesley De Bruin*

ATTORNEY

United States Patent Office 2,946,983
Patented July 26, 1960

2,946,983

COMPARISON CIRCUITS

Charles R. Borders, Alpine, N.J., and James W. Toner, Poughkeepsie, N.Y., assignors to International Business Machines Corporation, New York, N.Y., a corporation of New York Filed Nov. 14, 1955, Ser. No. 546,402

1 Claim. (Cl. 340—149)

Figures 1, 2:
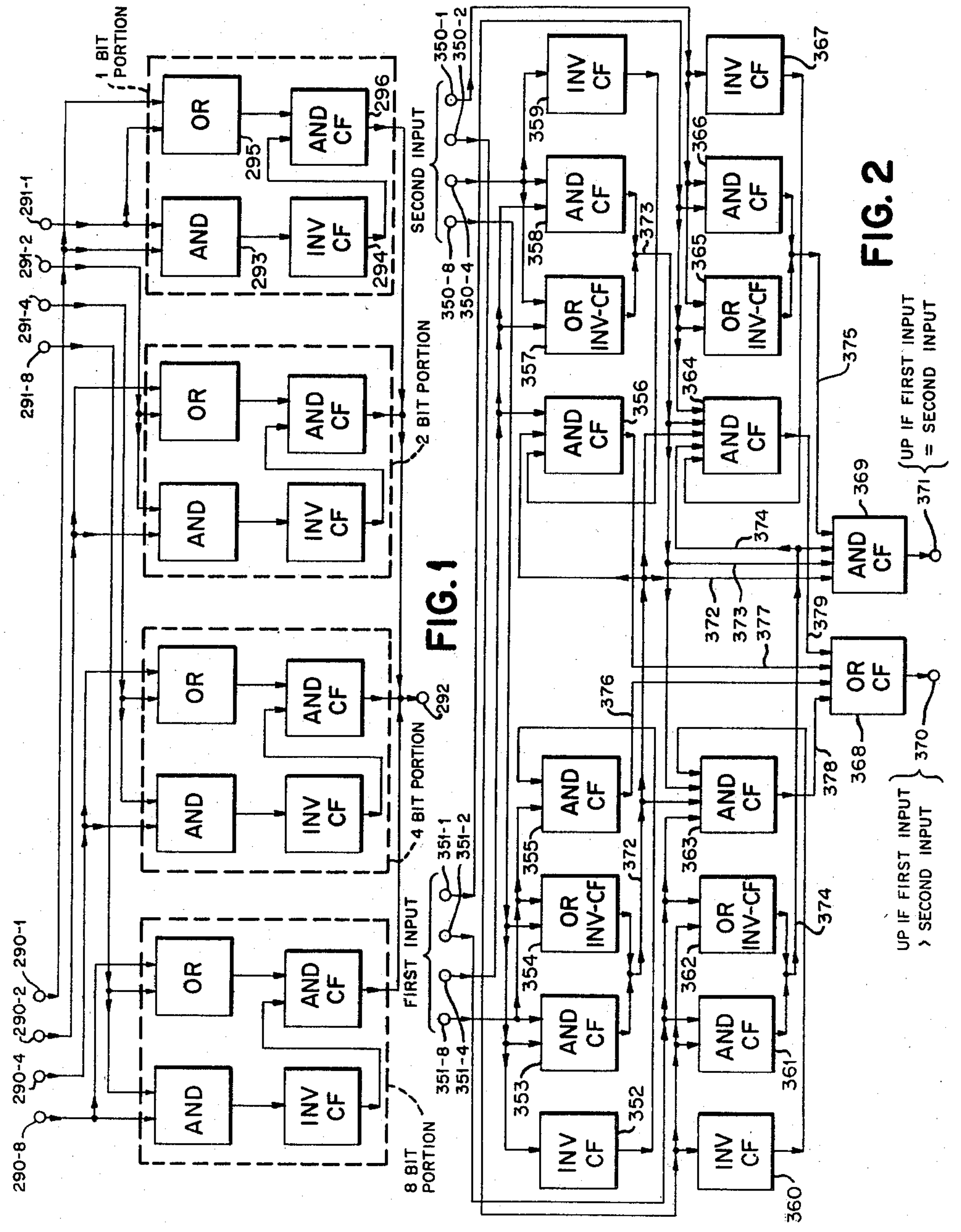

This invention relates to comparison circuits and more particularly to circuits for accepting a first decimal input expressed in binary-decimal notation parallel by bit, serial by decimal digit order, and a second decimal input expressed in binary-decimal notation parallel by bit, serial by decimal order and rendering a manifestation indicative of the relative magnitude of said first and second decimal inputs.

Briefly, each of the comparison circuits consists of AND, OR, and Inverter circuits logically interconnected.

The AND, OR and Inverter circuits employed may be generally of the type disclosed in U.S. patent application Serial No. 465,076 of William J. Deerhake et al., entitled "Checking Circuit," filed on October 27, 1954, now Patent No. 2,826,359, and of common assignee herewith.

The primary object of the present invention is a comparison circuit that will accept a first binary-decimal number input and a second binary-decimal number input and render without delay an electrical representation indicative of the relative magnitude of said first input with respect to said second input.

A second object of the present invention is a comparison circuit capable of accepting a first binary-decimal number input and a second binary-decimal number input and without delay, rendering a first manifestation if said first input is equal to said second input and a second manifestation if said first input is unequal to said second input.

A still further object of the present invention is a comparison circuit employing a minimum number of components, and rendering without delay, an accurate electrical manifestation indicative of the relative magnitude of a first electrically manifested decimal input with respect to a second electrically manifested decimal input.

A still further object of the present invention is a comparison circuit that may be employed in a binary coded decimal system of notation.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 discloses the logical circuit diagram of a first comparison circuit hereinafter referred to as an Inequality Detector; and Fig. 2 discloses the logical circuit diagram of a second comparison circuit hereinafter referred to as a Digit Comparator.

For purposes of clarity and consistency a number of definitions of terminology and symbols will be set forth:

In the binary notation only two digits are employed, i.e., 0 and 1. The decimal digit 0 is represented by binary digit 0 and the decimal digit 1 is represented by binary digit 1. These binary digits are referred to as bits. The digital positions or orders in a binary number, reading from right to left, correspond in value to $2^0$, $2^1$, $2^2$, $2^3$, $2^4$, etc. or decimal digits 1, 2, 4, 8, 16, etc., respectively. For example, binary number 1001 represents decimal digit 9 which is determined by the addition of decimal digits 1 and 8 indicated by a binary 1 in the extreme right and left binary positions respectively. Hence, by using binary bits or pulses in groups of four wherein a pulse represents a binary 1 and the absence of a pulse represents a binary 0, any decimal digit from 0–9 inclusive may be written in the pure binary notation.

The system of representing decimal numbers, digit for digit, in the pure binary notation is referred to herein as the binary-decimal system. The four consecutive binary orders, reading from right to left, represent the decimal digits 1, 2, 4 and 8 for the units decimal order and are accordingly referred to as the 1 bit, 2 bit, 4 bit and 8 bit, respectively. It follows that the four binary orders of the tens decimal order represent the decimal digits 10, 20, 40 and 80, respectively. Likewise, in higher decimal orders, for example, the four respective binary orders of the hundreds decimal order represent the decimal digits 100, 200, 400 and 800, respectively.

As an example, 459 will be represented in the binary-decimal system by 0100, 0101, 1001. The four binary bits at the right represent the decimal digit 9 of the units order, the next four bits to the left represent the decimal digit 5 of the tens order, and the four bits at the extreme left represent the decimal digit 4 of the hundreds order.

Any decimal number from 0 through 15, inclusive, can be represented by a group of four binary bits. However, in the binary-decimal system, only the decimal digits 0 through 9 inclusive are represented by each group of four binary bits.

Various circuits used herein or particular points within the circuits are frequently referred to as Up or Down. Up means that the voltage present at the particular point or at the output of the circuit designated is positive with respect to ground. Down means that the voltage present at the particular point or at the output of the circuit designated is negative with respect to ground. If the control grid of a vacuum tube is referred to as Down, it means that the voltage at that control grid is below the cutoff value for the vacuum tube.

Numerous coincidence circuits are employed herein. An AND circuit refers to a circuit which is operable to produce a positive voltage at its output terminal only when all of the input terminals thereof have a positive voltage applied thereto simultaneously. An OR circuit refers to a circuit operable to produce a positive voltage at its output terminal when one, or more of the input terminals thereof has a positive voltage applied thereto.

When a terminal is referred to as being Up, the presence of a binary 1 is indicated. Correspondingly, when a terminal is referred to as Down the absence of a binary 1 is indicated, i.e., the presence of a binary 0.

It is to be appreciated that the comparison circuits disclosed herein will function very satisfactorily at a pulse repetition rate equal to or in excess of one microsecond. In other words, the Up pulse manifesting the presence of a bit may be of one microsecond duration. Correspondingly, a Down condition of one microsecond is equally effective. Thus even though the presence of a numerical quantity is disclosed by Up pulses throughout the specification, it will be obvious to those skilled in the art, how Down pulses could be utilized to manifest the presence of a quantity and employ the comparison circuits herein disclosed.

*The Inequality Detector of Fig. 1.*—Fig. 1 discloses the logical circuit diagram of an Inequality Detector. The Inequality Detector has a first group of four input terminals 290 and including a 1 bit, a 2 bit, a 4 bit and an 8 bit input terminal and a second group of four input terminals 291 and including a 1 bit, a 2 bit, a 4 bit and an 8 bit terminal. The Inequality Detector has a single output terminal 292 that will be in the Up condition when an inequality has been detected. That is, terminal 292 will be Up when the input impressed on input terminals 290 is greater in magnitude than the input impressed on input terminals 291, or vice versa. Terminal 292 will be Down when the input impressed on input terminals 290 is equal in magnituude to the input impressed on input terminals 291.

It will be appreciated from Fig. 1 that the Inequality Detector is symmetrical in the sense that the portion associated with the 1 bit of input terminals 290 and 291 is respectively identical with the portion of the detector that is associated with the 2 bit input terminals of terminals 290 and 291; with the portion of the detector that is associated with 4 bit input terminals of terminals 290 and 291; and with the portion of the detector that is associated with 8 bit input terminals of terminals 290 and 291.

The Inequality Detector accepts a first and second decimal input, respectively expressed in binary-decimal notation, parallel by bit, serial by digit order, simultaneously, on its first and second groups of input terminals, namely, 290 and 291.

Referring to Fig. 1, it will be apparent that a complete and detailed discussion of the 1 bit portion of the Inequality Detector is sufficient since the 2, 4 and 8 bit portions thereof function in essentially the same manner as the 1 bit portion.

Referring to Fig. 1 and in particular to the portion of the Inequality Detector enclosed by the broken line labelled "1 Bit Portion," it will be seen that the 1 bit input terminal 290–1 is connected to one of the inputs of AND circuit 293 and also to one of the inputs of OR circuit 295. The 1 bit input terminal 291–1 is connected to the other input of AND circuit 293 and to the other input of OR circuit 295. The output of AND circuit 293 is connected to the input of inverter circuit 294. The output of inverter circuit 294 is connected to one input of AND circuit 296. The output of OR circuit 295 is connected to the other input of AND circuit 296. The output of AND circuit 296 is connected to output terminal 292 of the Inequality Detector. As is apparent from Fig. 1, the outputs of the 2 bit portion, the 4 bit portion, and the 8 bit portion of the Inequality Detector are also connected to output terminal 292 of the Inequality Detector.

The 1 bit portion of the Inequality Detector functions as follows: Assume that the 1 bit terminal 290–1 and the 1 bit terminal 291–1 are respectively simultaneously in the Up condition. Then the following conditions exist, namely, both inputs of OR circuit 295 are Up, as is the output of said OR circuit, and one input of AND circuit 296. However, both inputs of AND circuit 293 are also Up, resulting in the output of said AND circuit being Up and the output of inverter circuit 294 and one input of AND circuit 296 being Down. Thus when one input of AND circuit 296 is Up and the other input thereof is Down, the output of said AND circuit will be Down. It will now be apparent that when both 1 bit input terminals, namely 290–1 and 291–1, of the Inequality Detector are simultaneously in the same condition [i.e., Up or Down], the output of AND circuit 296 will be Down. Output terminal 292 of the Inequality Detector will also be Down provided the 2 bit, the 4 bit and 8 bit portions of the Inequality Detector have not detected an inequality.

Now assume that the inputs simultaneously impressed on the 2, 4 and 8 bits input terminals, respectively, of input terminal groups 290 and 291 are equal, whereas the 1 bit terminal 290–1 is in the Up condition and the 1 bit terminal 291–1 is in the Down condition. It will now be apparent that since 1 bit terminal 291–1 is in the Down condition, AND circuit 293 will not be energized (i.e., its output will be Down) and thus the output of inverter circuit 294 will be Up resulting in one input of AND circuit 296 also being Up. As a result of 1 bit terminal 290–1 being in the Up condition, OR circuit 295 will be energized (i.e., its output Up) resulting in the other input of AND circuit 296 being in the Up condition. Thus both inputs of AND circuit 296 are simultaneously in the Up condition, the output of said AND circuit is in the Up condition as is output terminal 292 of the Inequality Detector. It is now apparent that when the two inputs simultaneously impressed upon the Inequality Detector are unequal, output terminal 292 will manifest this condition by being in the Up condition.

The 2, 4 and 8 bit portions of the Inequality Detector are essentially identical to, and function in the same manner, as the 1 bit portion explained in detail above. Thus it will be apparent that an inequality detected by any one or more portions of the Inequality Detector will result in output terminal 292 being in the Up condition.

*The Digit Comparator of Fig. 2.*—Referring to Fig. 2, a logical circuit diagram of a Digit Comparator circuit is shown. Briefly, the Digit Comparator circuit of Fig. 2 has a first group [351–1, 351–2, 351–4 and 351–8] and a second group [350–1, 350–2, 350–4 and 350–8] of input terminals, each group consisting of a 1, 2, 4 and 8 an bit terminal, an equal output terminal 371, and a greater-than output terminal 370. The Digit Comparator circuit will simultaneously accept first and second decimal inputs respectively expressed in binary-decimal notation, parallel by bit and serial by decimal digit order, and electrically manifest at its output terminals whether the first and second decimal inputs are equal in magnitude, whether the first decimal input is greater in magnitude than the second decimal input, or whether the second decimal input is greater in magnitude than the first decimal input.

The above functions are accomplished by the circuitry of Fig. 2 as follows: OR circuit 368 will only be energized when the first decimal input is greater in magnitude than the second decimal input, whereas AND circuit 369 will only be energized when the first decimal input and second decimal input are equal in magnitude. Thus, when the second decimal input is greater in magnitude than the first decimal input, neither OR circuit 368 nor AND circuit 369 will be energized.

Referring to Fig. 2, it will be seen that associated with the 1 bit input terminals of the first and second group of input terminals are AND circuit 364, OR-Inverter circuit 365, AND circuit 366 and inverter circuit 367. Corresponding circuitry is associated with the 2 bit input terminals, the 4 bit input terminals and the 8 bit input terminals, respectively, of the first and second groups of input terminals. Further, from an inspection of the logical circuit diagram of Fig. 2 it will be seen that OR circuit 368 and AND circuit 369 respond to the coincidence circuit means associated with the respective pairs (i.e., 1, 2, 4 and 8 bit) of input terminals of the first and second group of input terminals and interconnections between said coincidence circuit means.

The detailed operation of the Digit Comparator circuit will be readily understood from the following examples:

*Example No. 1.*—Assume that the decimal input impressed on the first group of input terminals 351 is equal in magnitude to the decimal input impressed on the second group of input terminals 350. More specifically, assume that only the 8 bit input terminals, namely 351–8 and 350–8, are in the Up condition and all other input terminals are in the Down condition. Then referring to Fig. 2, the following conditions will be seen to exist, namely, inverter circuit 352, AND circuit 353 and OR-Inverter circuit 354 will respectively be energized, whereas AND circuit 355 will be de-energized. That is, the input of inverter 352 will be Up, the output thereof will be Down resulting in one of the inputs of And circuit 355 being Down and precluding this And circuit from being energized. Thus the output of AND circuit 355, lead 376, will be Down. Further, both inputs of AND circuit 353 will be Up and therefore the output of said AND circuit will be Up. [It will be appreciated that OR-Inverter circuit 354 and AND circuit 353 constitute a common cathode OR circuit. This will be even more apparent by referring to the detailed circuit diagram of the AND and OR-Inverter circuits disclosed in the afore-recited U.S. patent application of W. J. Deerhake et al.] When the output of AND circuit 353 is Up, lead 372 will be Up. Thus as a result of both 8 bit input terminals being respectively in the Up condition, lead 372 is Up and lead 376 is Down.

The 4 bit input terminals are respectively in the Down condition and result in OR-Inverter circuit 357 having its output in the Up condition. When the output of said OR-Inverter circuit is Up, lead 373 is Up. When the 4 bit terminal of the first group of input terminals (namely, input terminal 351–4) is Down, AND circuit 356 is de-energized. Thus its output is Down as is lead 377. Summary: Lead 373 Up, lead 377 Down.

When both 2 bit input terminals of the Digit Comparator are respectively in the Down condition, the output of OR-Inverter circuit 362 is Up as is lead 374. Also, since input terminal 351–2 is Down, AND circuit 363 is de-energized and its output lead 378 is Down. Summary: lead 374 is Up, lead 378 Down.

When both 1 bit input terminals are respectively Down, the output of OR-Inverter circuit 365 is Up, as is lead 375. Also, since input terminal 351–1 is Down, AND circuit 364 is de-energized and lead 379 is Down. Summary: Lead 375 Up, lead 379 Down.

From the foregoing detailed explanation, it will now be seen, that under the conditions of this example, leads 376, 377, 378 and 379, which constitute the four inputs to OR circuit 368, are respectively in the Down condition. Thus terminal 370 is Down. Further, under the conditions of this example, leads 372, 373, 374 and 375 are respectively Up and these leads constitute the four inputs to AND circuit 369. Thus the output of AND circuit 369 is Up manifesting the condition that the first and second decimal inputs to the Digit Comparator circuit are equal in magnitude. The equal terminal 371 will be Up when the output of AND circuit 369 is Up.

*Example No. 2.*—As a second example explaining the operation of the Digit Comparator of Fig. 2, let it be assumed that the decimal input impressed on input terminals 351 is greater in magnitude than the decimal input impressed on input terminals 350. Specifically, let it be assumed that only the 1 and 4 bit terminals of input terminals 351 are respectively in the Up condition, whereas only the 2 bit terminal of input terminals 350 is in the Up condition. Then referring to Fig. 2, it will be seen that terminals 351–1, 351–4 and 350–2 will respectively be in the Up condition and all the remaining input terminals will respectively be in the Down condition. Referring to AND circuit 366, it will be seen that only one of its input terminals is Up and thus its output would be Down. Further, OR-Inverter circuit 365 [that is so connected to AND circuit 366 as to constitute a common cathode OR circuit] has one of its inputs in the Up condition, resulting in lead 375 being in the Down condition. It will be appreciated that when lead 375 is in the Down condition AND circuit 369 is precluded from being energized, no matter what the condition, i.e., Up or Down, of the remaining three inputs to the AND circuit.

Now it is to be appreciated that since input terminal 350–4 is Down, inverter circuit 359 will have its output Up and thus one of the inputs of AND circuit 356 will be Up. Further, since input terminal 351–4 is Up, a second one of the inputs of AND circuit 356 will be Up. The third input of AND circuit 356 will be Up as a result of the following conditions; namely, input terminals 350–8 and 351–8 are respectively in the Down condition; it follows that the output of OR-Inverter circuit 354 will be Up resulting in lead 372 being in the Up condition; and lead 372 is connected to the third input of AND circuit 356. Thus AND circuit 356 is energized and its output is in the Up condition. The output of AND circuit 356 is conveyed via lead 377 to one of the input terminals of OR circuit 368. This results in OR circuit 368 being energized and its output assuming the Up condition. As pointed out earlier, when the output of OR circuit 368 is Up, terminal 370 is Up and manifests the condition that the decimal input impressed on input terminals 351 is greater in magnitude than the decimal input impressed on input terminals 350.

*Example No. 3.*—As a third example, let it be assumed that the decimal input impressed on input terminals 350 is greater in magnitude than the decimal input impressed on input terminals 351. That is, let it be assumed that the 1 bit terminal of terminals 350 is in the Up condition and all the remaining input terminals are Down. Referring to Fig. 2, it will be seen that when input terminal 350–1 is Up, inverter circuit 367 has its output in the Down condition and this results in one of the inputs of AND circuit 364 being Down. Thus AND circuit 364 is precluded from being energized and its output, lead 379, which constitutes one of the four inputs to OR circuit 368 will be Down. Further, when input terminal 350–1 is Up and input terminal 351–1 is Down, OR-Inverter circuit 365 will have its output Down and thus lead 375 will be in the Down condition. The Down condition of lead 375 precludes AND circuit 369 from being energized regardless of the condition of leads 372, 373 and 374. Thus it is seen that under the conditions of this example, the equal terminal 371 is precluded from assuming the Up condition.

Now referring to Fig. 2, it will be seen that when input terminals 351–1, 351–2, 351–4 and 351–8 are respectively in the Down condition, AND circuits 355, 356, 363, and 364 will respectively be precluded from being energized under the conditions of this example, since each of these AND circuits has at least one input in the Down condition. Further, it will be noted that the outputs of the afore-recited AND circuits are respectively connected through leads 376, 377, 378 and 379 to the four input terminals of OR circuit 368. Since all of these leads are in the Down condition, the four inputs of OR circuit 368 are Down as is the output of said OR circuit and terminal 370. Thus terminal 370 is in the Down condition and this, in conjunction with the fact that terminal 371 is also in the Down condition, manifests that the decimal input impressed on input terminals 350 is greater in magnitude than the decimal input impressed on terminals 351.

The afore-recited three examples, as is obvious to those skilled in the art, are only three possible conditions under which the Digit Comparator circuit will render an equal or greater than manifestation as to the relative magnitude of first and second decimal inputs. However, it will be apparent from the afore-recited examples, how the Digit Comparator of Fig. 2 will accept a first input of any decimal value 0 through 9 expressed in binary-decimal notation simultaneously with the acceptance of a second input of any decimal value 0 through 9 expressed in binary-decimal notation, and render an electrical manifestation as to which input is greater in magnitude (i.e., first or second input) or whether they are equal in magnitude.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claim:

What is claimed is:

A decimal digit comparator circuit for simultaneously accepting a first electrical manifestation representative of a first decimal digit input expressed in binary-coded decimal notation, and a second electrical manifestation representative of a second decimal digit input expressed in binary-coded decimal notation and rendering one of three discrete electrical manifestations which respectively indicate whether said first decimal digit input is equal in magnitude to said second decimal digit input, said first decimal digit input is greater in magnitude than said second decimal digit input, or said second decimal digit input is greater in magnitude than said first decimal digit input, said decimal digit comparator circuit consisting in combination of: a first group of input terminals consisting of a 1-bit input terminal, 2-bit input terminal, a 4-bit input terminal, and an 8-bit input terminal; a second group of input terminals consisting of a 1-bit input terminal, a 2-bit input terminal, a 4-bit input terminal, and an 8-bit input terminal; a first output terminal; a second output terminal; a first AND circuit having first and second inputs and an output; a second AND circuit having first and second inputs and an output; a third AND circuit having first, second and third inputs and an output; a fourth AND circuit having first and second inputs, and an output; a fifth AND circuit having first and second inputs and an output; a sixth AND circuit having first, second, third and fourth inputs and an output; a seventh AND circuit having first, second, third, fourth and fifth inputs and an output; an eighth AND circuit having first and second inputs and an output; a ninth AND circuit having first, second, third and fourth inputs and an output directly connected to said first output terminal of said decimal digit comparator; a first Inverter circuit having an input and an output; a second Inverter circuit having an input and an output; a third Inverter circuit having an input and an output; a fourth Inverter circuit having an input and an output; a first OR-Inverter circuit having first and second inputs and an output; a second OR-Inverter circuit having first and second inputs and an output; a third OR-Inverter circuit having first and second inputs and an output; a fourth OR-Inverter circuit having first and second inputs and an output; a first OR circuit having first, second, third and fourth inputs and an output directly connected to said second output terminal of decimal digit comparator; a direct connection between said 1-bit input terminal of said first group of input terminals, said first input of said eighth AND circuit, said first input of said fourth OR-Inverter circuit and said fifth input of said seventh AND circuit; a direct connection between said 1-bit input terminal of said second group of input terminals, said input of said fourth Inverter circuit, said second input of said eighth AND circuit, and said second input of said fourth OR-Inverter circuit; a direct connection between said 2-bit input terminal of said first group of input terminals, said second input of said fifth AND circuit, said second input of said third OR-Inverter circuit, and said first input of said sixth AND circuit; a direct connection between said 2-bit input terminal of said second group of input terminals, said input of said third Inverter circuit, said first input of said fifth AND circuit, and said first input of said third OR-Inverter circuit; a direct connection between said 4-bit input terminal of said first group of input terminals, said third input of said third AND circuit, said first input of said second OR-Inverter circuit, and said first input of said fourth AND circuit; a direct connection between said 4-bit input terminal of said second group of input terminals, said second input of said second OR-Inverter circuit, said second input of said fourth AND circuit, and said input of said second Inverter circuit; a direct connection between said 8-bit input terminal of said first group of input terminals, said second input of said first AND circuit, said second input of said first OR-Inverter circuit, and said first input of said second AND circuit; a direct connection between said 8-bit input terminal of said second group of input terminals, said first input of said first OR-Inverter circuit, said first input of said first AND circuit, and said input of said first Inverter circuit; a direct connection between said output of said first Inverter circuit and said second input of said second AND circuit; a direct connection between said output of said second Inverter circuit and said first input of said third AND circuit; a direct connection between said output of said first AND circuit, said output of said first OR-Inverter circuit, said second input of said sixth AND circuit; said second input of said third AND circuit, said third input of said seventh AND circuit, and said first input of said ninth AND circuit; a direct connection between said output of said second AND circuit and said second input of said first OR circuit, a direct connection between said output of said third AND circuit and said third input of said first OR circuit; a direct connection between said output of said second OR-Inverter circuit, said output of said fourth AND circuit, said fourth input of said seventh AND circuit, said second input of said ninth AND circuit, and said third input of said sixth AND circuit; a direct connection between said output of said third Inverter circuit and said fourth input of said sixth AND circuit; a direct connection between said output of said fourth Inverter circuit and said first input of said seventh AND circuit; a direct connection between said output of said fifth AND circuit, said output of said third OR-Inverter circuit, said third input of said ninth AND circuit, and said second input of said seventh AND circuit; a direct connection between said output of said eighth AND circuit, said output of said fourth OR-Inverter circuit, and said fourth input of said ninth AND circuit; a direct connection between the output of said sixth AND circuit and said first input of said first OR circuit; a direct connection between said output of said seventh AND circuit and said fourth input of said first OR circuit; whereby a first discrete electrical manifestation will appear at said first and second output terminals when said first decimal digit input is greater in magnitude than said second decimal digit input, a second discrete electrical manifestation will appear at said first and second output terminals when said second decimal digit is greater in magnitude than said first decimal digit, and a third discrete electrical manifestation will appear at said first and second output terminals when said first and second decimal digits are equal in magnitude.

References Cited in the file of this patent

UNITED STATES PATENTS

| | | |
|---|---|---|
| 2,615,127 | Edwards | Oct. 21, 1952 |
| 2,641,696 | Woolard | June 9, 1953 |
| 2,749,440 | Cartwright | June 5, 1956 |

OTHER REFERENCES

Proceedings of the I.R.E. (Sherertz) Oct. 1953, pp. 1318–1319, vol. 41.